United States Patent [19]

Fitzner

[11] 3,965,879

[45] June 29, 1976

[54] RADIO FREQUENCY INTERFERENCE SUPPRESSION APPARATUS

[75] Inventor: Arthur O. Fitzner, Fond du Lac, Wis.

[73] Assignee: Brunswick Corporation, Skokie, Ill.

[22] Filed: Mar. 26, 1974

[21] Appl. No.: 454,803

[52] U.S. Cl. ........................ 123/148 P; 123/148 A; 123/169 PH; 313/134; 338/66; 339/143 S

[51] Int. Cl.[2] .................. H04B 15/02; H01R 13/46; F02P 11/00

[58] Field of Search....... 123/148 P, 169 PH, 169 P, 123/169 PA; 313/134, 135, 137; 338/66, 214; 333/12; 174/35 SM, 36; 339/136 C, 143 S

[56] References Cited

UNITED STATES PATENTS

| | | | |
|---|---|---|---|
| 1,245,931 | 11/1917 | Lanman | 123/169 PH |
| 1,806,548 | 5/1931 | Rabezzana | 123/148 P |
| 1,862,876 | 6/1932 | Wright et al. | 123/148 P X |
| 1,943,739 | 1/1934 | Nowosielski | 313/134 X |
| 2,080,827 | 5/1937 | Mascuch | 313/134 X |
| 2,149,027 | 2/1939 | Meredith | 123/169 PH |
| 2.177,268 | 10/1939 | Stone et al. | 313/134 X |
| 2,276,966 | 3/1942 | Hansell | 123/148 P |
| 2,296,054 | 9/1942 | Rabezzana | 123/169 PH X |
| 2,301,572 | 11/1942 | Nowosielski | 123/169 PH |
| 2,322,773 | 6/1943 | Peters | 123/148 P |
| 2,480,545 | 8/1949 | Burrell | 123/169 PH X |
| 2,690,541 | 9/1954 | Elliott | 123/169 PH |
| 3,683,309 | 8/1972 | Hirose | 338/66 X |
| 3,813,643 | 5/1974 | Hartz | 338/66 X |

FOREIGN PATENTS OR APPLICATIONS

| | | | |
|---|---|---|---|
| 1,288,797 | 2/1962 | France | 123/169 P |
| 891,463 | 3/1944 | France | 313/134 |

*Primary Examiner*—Charles J. Myhre
*Assistant Examiner*—Tony Argenbright
*Attorney, Agent, or Firm*—Andrus, Sceales, Starke & Sawall

[57] ABSTRACT

An ignition wiring system having the leads formed as a wire coil about a magnetizable core defines a distributed constant resistive-inductive series impedance. A metal shield is located over the spark plug proper and electrically connected to the engine ground. A flexible shield extension in the form of a coil extends over the lead from beneath the shield. The shield and shield extension introduce distributed capacitance between the special lead and engine ground. The combination of the shield and shield extension with the special lead forms a distributed constant RLC filter which produces RFI suppression. The shield and shield extension confine the electromagnetic radiation emanating from that portion of the lead where the radiation is strongest, thereby enhancing the suppression. The rapid discharge by the spark plug of the stored energy contained in the distributed capacitance increases the spark intensity and promotes more complete combustion.

18 Claims, 4 Drawing Figures

RADIO FREQUENCY INTERFERENCE SUPPRESSION APPARATUS

BACKGROUND OF THE INVENTION

This invention relates to radio frequency interference suppression means which attenuate unwanted radio frequency interference associated with the firing of a spark plug and the like and, particularly, to ignition wiring systems for internal combustion engines associated therewith.

Spark-ignited internal combustion engines generally employ a separate spark plug for each cylinder to ignite the fuel mixture. The spark plug generally employs a pair of electrodes defining a gap across which a spark is initiated by the application of a high voltage.

Multiple cylinder engines of the above type have generally employed a distributor to direct the high voltage output of the ignition coil to the proper one of the spark plugs. A lead from the ignition coil connects the output of the coil to a rotating distributor electrode via a carbon brush riding on the electrode. The rotating electrode is mechanically synchronized to the engine, and makes a close physical approach to, but normally does not touch, the fixed distributor electrodes. Each fixed electrode is connected by a lead to an associated spark plug. When a selected spark plug is to be fired, the high voltage output from the ignition coil sparks across from the rotating electrode to the proper fixed electrode, thereby establishing a path from the ignition coil to the selected spark plug.

Sparks generated in modern ignition systems constitute relatively strong radio frequency interference sources. The strongest interference source is generally the spark plug, because of the high voltage required to initiate the discharge. The distributor gap generally sparks across before the spark plug, at a much lower voltage, and is thus generally the weaker of the two sources.

Suppression or radio frequency interference is highly desirable and is particularly so with the more recently developed capacitor discharge ignition systems which are generally accompanied by high levels of such interference. Recommendations as to the limits on the levels of such interference have been established by the Society of Automotive Engineers (SAE); and by the Comite International Special des Perturbations Radioelectriques (C.I.S.P.R.). Most of the nations of the world have adopted one or ther other of these recommendations in establishing official limits on the levels of radio frequency interference that shall be allowed.

Automobiles and like vehicles have typically used spark-ignited internal combustion engines operating on the four-stroke cycle, wherein the lubricating oil is kept largely separated from the combustible mixture. Consequently, the spark plugs are normally free of low resistance fouling, which allows such engines to make satisfactory use of inductive ignition systems, which are characterized by a relatively slow build-up of voltage across the spark gap followed by a long duration spark discharge at relatively low currents. Such spark gap and ignition system characteristics have, in turn, allowed the general use of high resistance ignition leads for suppression of the interferences generated by the firings of the distributor gaps and the spark plug gaps.

Outboard motors, snowmobiles, and the like, in the interest of high power output from engines of light weight have typically operated on the two-stroke cycle, wherein the lubricating oil is generally pre-mixed with the fuel and is, therefore, distributed throughout the combustible mixture. Spark plugs in such engines are subject to resistance fouling conditions such that satisfactory operation may require the use of a capacitor discharge ignition system. Such ignition systems are characterized by a very fast build-up of voltage on the ignition coil output, which can rise to a sparking voltage level even if loaded down with a resistance-fouled spark plug such as would render an inductive ignition system inoperative. After the initiation of the spark, a relatively short duration spark discharge at relatively high current follows. Such spark gap and ignition system characteristics have prohibited the use of high resistances in the path between the ignition coil and the spark plug gap, whether in the form of high resistance leads, or high resistance resistor spark plugs, or both.

In general, suppression methods which have proven effective on automotive inductive ignition systems have seriously degraded engine performance when applied to capacitor discharge ignition systems on two-stroke cycle engines, such as outboard motors and the like.

One method which has been suggested to reduce radio frequency interference on outboard motors is an arrangement wherein various lumped-constant suppression elements are incorporated into the ends of the various ignition leads.

At the spark plug end, the lead is fitted with a grounded electrostatic shield in combination with a lumped inductance coil built into the outer end portion of the shield and adjacent to the spark plug. The shield is made of two halves permanently crimped together. A flexible coiled spring about 1.5 inches long enclosing the ignition lead is located on the other side of the inductance coil. A grounding wire extending from the coiled spring is trapped under the shield at the time the two halves are crimped together. By virtue of this construction, a lumped-constant LC filter is formed by the inductance of the inductance coil and the capacitance between the ignition cable conductor and the grounded flexible coiled spring.

At the distributor end, the various ignition leads are fitted with lumped constant resistors. The resistor values are relatively low.

The lumped-constant elements contribute to interference suppression and hold resistance losses to a moderately low level. However, the use of the lumped-constant elements to be incorporated into the wiring system is relatively expensive and is vulnerable to normal difficulties arising from vibration and heat plus the physical stresses accompanying routine spark plug replacement and the like.

Thus, there is a need for a simpler, more sturdy suppression means which does not require lumped-constant elements incorporated in the ignition leads.

SUMMARY OF THE PRESENT INVENTION

The present invention is particularly directed to an ignition wiring system having improved RFI suppression means incorporated therein and in particular to a novel spark plug wiring assembly having an integral suppression means to eliminate the disadvantages normally associated with the prior art lumped-constant suppression element. Generally, in accordance with the teaching of the present invention, the spark plug lead at least immediately adjacent the spark plug is formed as a low-resistance wire coil about an insulating magnetizable core to define a distributed constant inductance-resistance characteristic. Generally, in accordance with a further novel feature of the present invention, a protective uninterrupted grounded shield, which, in a particularly novel construction, can be opened and closed like a clamshell, is secured overlying the spark plug to provide electrostatic shielding and capacitance to the circuit. The clamshell type shield permits installation over spark plugs located within an area of limited access. A flexible extension of the shield may advantageously be formed over the high tension lead to increase the shielding and distributed capacitance.

The electrostatic shielding and distributed-constant RLC filtering resulting from the distributed-constant impedance wiring and shield not only improves the suppression effect but also positively contributes to increased spark intensity. The capacitance means is a shunt energy storage means which, prior to discharge, is charged to a relatively high voltage. At the instance of discharge, this additional energy is rapidly released into the gap and thereby produces a "hotter" spark.

In a particularly novel construction, the grounded metallic clamshell shield is disposed over the conventional spark plug and terminal insulating boot for optimum electrostatic shielding. The high tension lead includes magnetizable particles dispersed within the insulation core. The metallic conductor of the high tension lead is spirally wound on the core to establish the distributed inductance and resistance and an outer insulating cover encases the core and spirally-wound conductor. A flexible coil in the form of a coil spring is placed over a portion of the high tension lead immediately adjacent the spark plug connection and extends from beneath the shield as an extension thereof. A compression spring is located under the spark plug hex means at the attachment to the engine block and is compressed between the block and the electrostatic shield. The compression spring assures that the electrostatic shield is grounded to the underside of the spark plug hex, and thus to the engine ground.

This combination creates a distributed-constant RLC low-pass filter consisting of the series distributed resistance and inductance of the high tension lead and the shunt distributed capacitance between the lead and the shield and shield extension. The high frequency components of the transient developed by the spark plug discharge are strongly attenuated by the time they reach the end of the shield extension and are thus suppressed.

In accordance with a further feature of the present invention, particularly where a distributor is employed, the total circuit wiring is especially constructed of the distributed-constant inductance-resistance conductor to further minimize RFI signal radiation from other portions of the system. Thus, a distributor requiring a spark to jump a small gap at atmospheric pressure constitutes a somewhat weaker radio frequency interference generator but one which can still introduce undesirably strong interference signals.

Further, if the ignition coil secondary winding is grounded to the shock-mounted cowl support bracket of an outboard motor or the like, the entire engine cowling will tend to function as a radio frequency radiator or antenna, even though the cowling is grounded to the engine block with ground straps where convenient. In an outboard motor, the remote control cables and the like may also constitute a radiating antenna which is coupled to the ignition wiring through stray capacitance. Finally, there is always some stray capacitance from the ignition wiring to elements of the cowling which are poorly grounded to the block, and which are driven to radiate via such stray capacitance.

The use of the special wiring of the present invention with the distributed inductance and resistance introduces a highly desired suppression of such signals.

Further, the several wires from and to the distributor may be spaced away from the nearby radiating elements to thereby minimize stray capacitive coupling. Where it is necessary to have the distributor wires relatively closely spaced to radiating elements, some grounded shielding may be advantageously applied to the leads, particularly close to the radiating elements.

Inasmuch as the resistance of the special distributed resistance and inductance ignition wiring is substantially less than and may be only about 10% of the resistance of the equivalent length of typical automotive high resistance suppression wire, it can be seen that the present invention provides a distinctly improved method of suppressing radio frequency interference particularly for outboard motors and the like utilizing capacitor discharge ignition systems.

BRIEF DESCRIPTION OF DRAWING

The drawing furnished herewith illustrates a preferred construction of the present invention in which the above advantages and features are clearly disclosed as well as others which will be readily understood from the subsequent description of such embodiments. In the drawing.

DESCRIPTION OF THE ILLUSTRATED EMBODIMENTS

Figure 1:
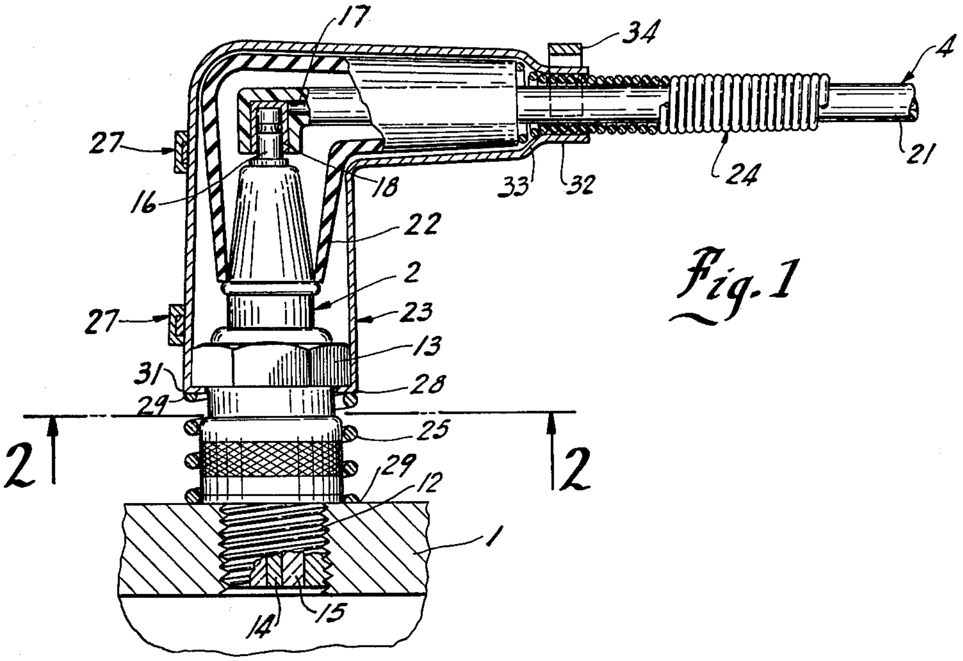
FIG. 1 is a side elevational view of a spark plug unit constructed in accordance with the present invention with parts broken away and sectioned to show inner details of construction.
Figure 2:
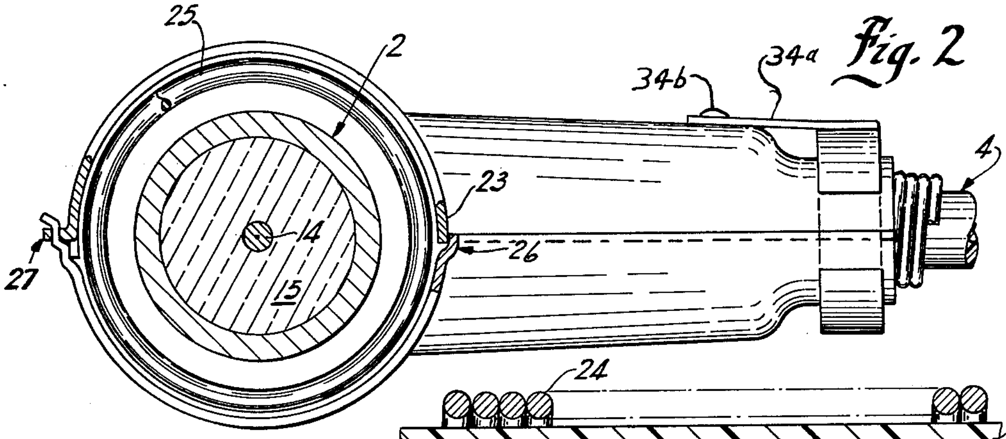
FIG. 2 is a horizontal section taken generally on line 2—2 of FIG. 1.
Figure 3:
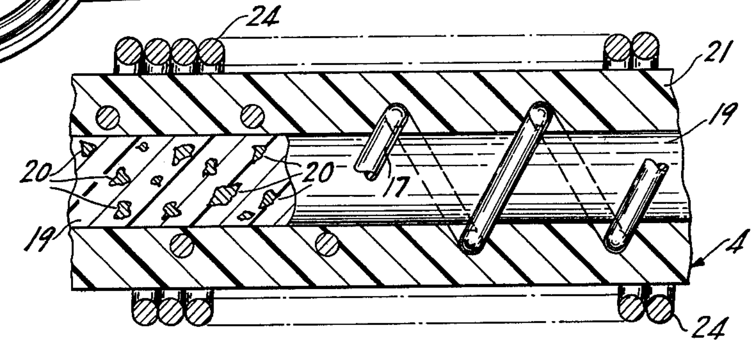
FIG. 3 is an enlarged view of the ignition lead.

Referring to the drawing and particularly to FIG. 1, the present invention is illustrated as applied to an internal combustion engine of which a fragmentary head portion of a single cylinder head 1 is illustrated. A spark plug 2 is secured to the cylinder head 1 and is shown connected, as in FIG. 4, to a distributor 3 by a special lead 4 for connection to a suitable power supply as diagrammatically shown. The distributor selectively and periodically connects the lead 4 in a set sequence with one or more similar leads 5 for an alternate cylinder or cylinders, not shown, depending upon the number of cylinders. The distributor 3 may be any suitable element and is diagrammatically illustrated including a rotating conductive arm 6 for selectively and sequentially coupling (via a small air gap) a lead 7 to the leads 4 and 5. A pulse transformer 8 has the high voltage terminal of the secondary winding 9 connected to the lead 7. The pulse transformer 8 preferably forms a part of a capacitor discharge ignition system 10 such as disclosed in U.S. Pat. No. 3,395,686. Thus, the system 10 may include a capacitor 11 which is charged to a relatively high voltage and then discharged at an appropriate time through pulse transformer 8. The coil 9 may be mounted and grounded to a mounting frame or bracket such as a cowl support, shown schematically as ground 9A, of an outboard motor.

The illustrated system is typical of distributor type ignition systems applied to internal combustion engines for outboard motors and other internal combustion engines. The present invention is particularly directed to the special construction and the interconnection of the several components and, in particular, to a special radio frequency interference suppression means associated with spark plug 2.

More particularly, spark plug 2 is shown as a conventional spark plug having a threaded mounting element 12 with a hex-head 13 for securing the spark plug 2 into the cylinder head 1. A polar gap type plug 2 is illustrated with a central electrode 14 terminating in the lower face of the spark plug and with an insulator 15 between such electrode and the peripheral edge of the spark plug which defines the second electrode. The spark plug 2 is thus grounded to the engine and upon application of an appropriate potential to the central electrode 14 a spark is generated between the center electrode 14 and the periphery of the plug 2. This spark ignites the fuel within the cylinder 1 in accordance with well-known phenomena. The insulator 15 projects outwardly through the hex nut 13, with the inner electrode 14 extended outwardly therefrom and terminating in an outer terminal 16 for connection to lead 4.

The lead 4 includes an inner conductor 17 terminating in a conventional connecting cap 18, adapted to be snapped over the outermost terminal 16. The inner conductor 17 extends through the lead 4 to a corresponding contact at the distributor 3 for selective transfer of the energy to the spark plug. The illustrated lead 4 is formed of a standard "Essex Magwire" cable and the inner conductor 17 is wound upon an inner core 19 which includes dispersed magnetizable particles 20 such that the lead has a distributed inductance and resistance. An outer insulating cover 21 encases the conductor 17.

A suitable insulating boot 22 which preferably may be formed of a suitable silicone rubber is generally L-shaped in construction to cover the L-shaped connection of the spark plug 2 to the lead 4 and the boot extends over the lead 4 and insulator 15 for a sufficient distance to insulate the connecting cap 18.

Generally, the illustrated embodiment of the present invention includes an electrostatic metal shield 23 secured over the spark plug 2 and boot 22 and also a portion of the lead 4. An extended shielding element 24 is wound beneath the shield 23 and about the lead 4 immediately adjacent to the boot. The shield 23 is forcibly pressed against and made to electrically contact the underside of hex 13 of the plug 2, by compression spring 25 which is located below the hex of plug 2. The shield 23 and shield extension 24, in combination with the distributed inductance and resistance of lead 4, defines an electrostatically enclosed distributed constant low pass filter network which, as more fully developed hereinafter, attenuates the high frequency components of the transient normally generated at the spark gap as the transient propagates rearwardly along the spark plug lead. The electrostatic enclosure and filter attenuation effectively minimizes radiation of such high frequency signals.

More particularly, in the illustrated embodiment of the invention, the shield 23 is formed as a two-piece tubular shield which is generally symmetrical with respect to an axial plane through the spark plug 2 and boot 22. Each of the shield members is generally an L-shaped member with the adjacent inner edges located in overlapping relationship as at 26 to define a generally L-shaped tubular passage generally conforming to the spark plug 2 and boot 22. The complementing or adjacent outer edges which extend along the shield enclosing the major upper portion of the plug 2 are formed with interlocking tabs 27 defining a pivotal joint to permit separation or opening of the two shield members in a clamshell fashion to at least a ninety degree open position for application and removal with respect to the spark plug 2.

The end of the shield immediately adjacent to the engine 1 is bent inwardly as at 28 to form a lip which abuts the metal shell or flange surface defined by the hex portion 13 of the spark plug 2. The lip 28 is clamped against and in engagement with the underside of hex 13, and thus grounded to the engine, by a flat end 29 of compression spring 25. The compression spring 25 is compressed between the block 1 and the underside of hex portion 13 to provide a firm pressure therebetween. The compression spring 25 has two flat ends 29, so that the spring 25 may be installed upside down with no detrimental effects. The purpose of the upper flat end 29 is to allow open shield 23 to be installed by a downward push-and-squeeze motion. The downward pressure of the lips in the area 31 on the flat end 29 of spring 25 causes a space to open up between the undersurface of hex portion 13 and flat end 29. The simultaneous squeeze causes the two halves of the shield 23 to close, driving the full lip edge of each shield half between flat end 29 of spring 25 and the undersurface of hex 13. The mechanical advantage of the wedge principle allows the lips to compress spring 25 such that the two halves of shield 23 are readily closed against the force exerted by spring 25. After being closed and locked by spring clip 34, shield 23 cannot be shaken off of spark plug 2 by engine vibrations. The clamshell construction and spring mounting permits installation of the shield with limited access to the spark plug such as encountered, for example, with the lower spark plug on a vertical in-line six-cylinder outboard motor.

The shield 23 projects outwardly over the boot 22 with the outermost end reduced as at 32 to a reduced diameter which is closed over the lead 4 and particularly the initial portion of the element 24.

The shield extension element 24 is shown as a flexible spring-like conductor wound over the lead 4, but with clearance between it and lead 4. The element 24 is preferably wound without any spacing between the adjacent turns and with spring tension at zero extension of the spring to establish firm abutting engagement and electrical contact between adjacent turns.

In the illustrated embodiment of the invention, the portion of the shield extension immediately adjacent the boot 22 is slightly flared outwardly as at 33 to be trapped within the reduced diameter of portion 32 of the shield 23.

A small U-shaped spring clip 34 is releasably clamped over the reduced diameter end portion 32 to maintain the shield 23 in a closed position and simultaneously trap the inner end of the shield extension 24 to provide firm electrical contact of the shield 23 to shield extension 24.

The clip 34 is illustrated as a generally U-shaped member having opposed arms partially encircling opposite sides of the opposite shield members. The clip 34 is formed with an offset base portion defining a gap or space with respect to the shield 23, as shown in FIG. 1. A small screwdriver blade or the like can be inserted in such space for releasing the clip 34 and opening of the shield 23 to remove same and to obtain access to the boot 22 and associated spark plug connection. The clip 34 may also have an integral tab 34*a* swingably fastened to one of the two shield members via a single rivet fastener 34*b* to retain the clip to the shield half with the shield in the open position. The single rivet fastener allows the clip 34 to swing to the open position.

In the illustrated embodiment of the invention, the leads 4, 5 and 7 are all similarly constructed of the special lead wire having the core 19 with the magnetizable particles 20, to provide for the distributed inductance and resistance.

Figure 4:
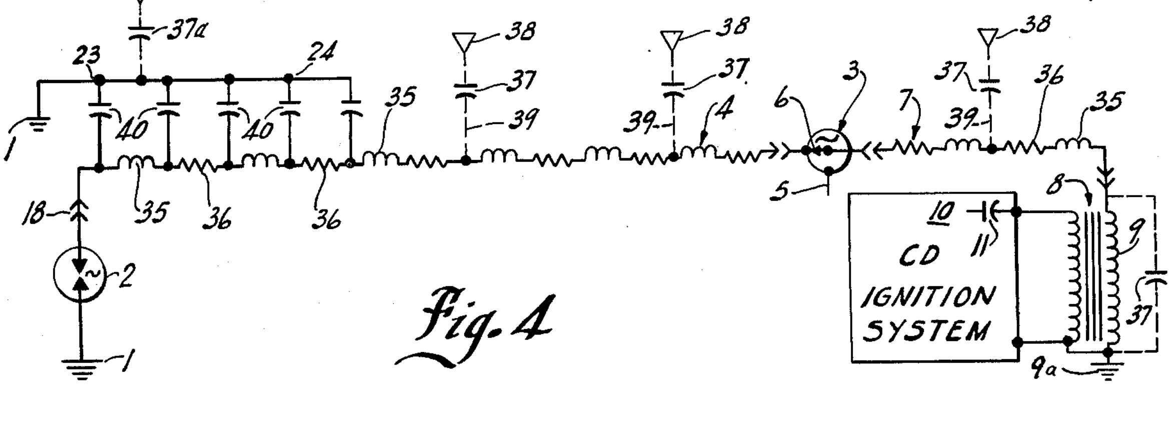
FIG. 4 is a diagrammatic illustration of an ignition system for purposes of describing the functional characteristics of the illustrated embodiment of the invention and its general application to the ignition system.

The wiring system for a single spark plug may be analyzed as in FIG. 4 The spark plug 2 is shown as an RFI signal generator connected between the engine block ground 1 and the spark plug connecting wire 4. The distributed inductance and resistance is illustrated by a plurality of lumped elements 35 and 36 in each of the connecting leads. Stray capacitance between the leads and the various surfaces couple the RF signal in the leads to such surfaces which function as RF radiating surfaces. The stray capacitances are shown at 37 connected to the radiating surfaces as antennas 38 by dotted lines 39.

The shield 23 and shield extension 24 form a plurality of parallel capacitors 40 connected between the lead 4 and ground 1, inasmuch as shield 23 and extension 24 are grounded to the metal base of the spark plug. The powerful radio frequency signals developed by spark plug 2 are strongly attenuated by the plurality of filtering sections formed by the plurality of elements 35, 36 and 40. Consequently, the radio frequency signal on that portion of the lead 4 extending outward to the right of shield 23 and shield extension 24 in the drawing is made relatively weak.

Conversely, the radio frequency signal on that portion of the lead 4 which is enclosed within the shield 23 or extension 24 is relatively strong, particularly that signal at the connector cap 18 and the portion of lead 4 immediately adjacent thereto. If there were no grounding of the shield 23 or extension 24, this strong signal would be coupled via capacitances 40 and stray capacitance 37*a* to the nearby engine cowling, from where it would be radiated as RF interference. But because shield 23 and shield extension 24 are present and well-grounded, most of this strong signal coupled via the capacitors 40 into shield 23 or extension 24 is diverted harmlessly into ground 1. The stray capacitance 37*a* from the shield 23 and extension 24 to the cowling, while present and significantly large, is therefore deprived of signal input.

Similarly, the distributor 4 is shown as a second RFI generator which results from the rotating contact and gap structure but it will, of course, be a much weaker source because of the lower voltage at which the distributor gap sparks across.

The ignition transformer 8 may form still a third RFI radiation source where it is mounted on and grounded to the cowl structure 9*a* which may, in turn, constitute a radiating surface, even though the cowl structure 9*a* may be connected to the engine block 1 via ground straps.

The surfaces of the outboard or the remote control cables and the like located in the immediate vicinity of the ignition leads are coupled thereto through stray capacitances and thereby also constitute radiators for the RFI. The distributor leads 4, 5 and 7 may be advantageously provided with short grounded shields to effectively reduce such couplings, if required.

Applicant has found that the distributed constant ignition wiring system as described, particularly in combination with the short uninterrupted length of grounded shielding over the spark plug and the adjacent lead 4, as well as a similar short grounded shield over the distributor leads if required, significantly reduces and attenuates the various radio frequency signals without noticeably degrading the engine performance.

The high level of engine performance observed when using the suppression apparatus of this invention appears to be the result of the relatively low resistances in the inductive-resistive ignition leads, particularly when compared to the resistance of a resistance-fouled spark plug. For example, "Essex Magwire" cable, as previously referred to, will have a resistance of about 600 ohms per foot or only 10% of the typical automotive high resistance suppression wire. The increased intensity of the spark produced as the energy contained in the distributed capacitance between the spark plug lead and the shield and shield extension initially discharged through the gap also contributes to the improved performance. Further, the sturdy construction of the various components comprising the inductive, capacitive and shielding elements will contribute to a long trouble-free life for the apparatus.

The present invention thus provides an improved and reliable means of suppressing radio frequency interference in internal combustion engine ignition systems, particularly capacitive discharge ignition systems, without sacrifice of engine performance.

Various modes of carrying out the invention are contemplated as being within the scope of the following claims, particularly pointing out and distinctly claiming the subject matter which is regarded as the invention.

I claim:

1. An ignition connection apparatus for interconnecting of a pulse signal to an igniting means of an internal combustion engine, comprising an ignition lead including a conducting element for carrying of the high voltage pulse signal and having a resistance on the order of 600 ohms per foot, said conducting element being wound on a magnetizable core to form a distributed inductive-resistive series impedance element and constituting the only inductance connected in the system, and a shield element applied over said lead to define a distributed capacitive shunt impedance, said shield is constructed to overlie the igniting means and defining an essentially uninterrupted shield, said shield including an extension in the form of a flexible coil wound about the lead with a plurality of abutting turns.

2. The apparatus of claim 1 wherein said coil is wound with the turns under tension at zero extension.

3. The apparatus of claim 1 wherein said core includes an insulator and magnetizable particles dispersed through said insulator.

4. The apparatus of claim 1 wherein, said igniting means includes a metal shell having a ledge portion, said shield element extending beneath the ledge portion, a compression spring coil placed about the igniting means and between the shield and the engine to force the shield into conductive contact with the ledge portion of the metal shell of the igniting means.

5. The apparatus of claim 4 wherein said shield includes a pair of side-hinged members, said coil includes a plurality of axially spaced turns of a resilient wire under compression, the turn engaging said shield being formed with a flat end surface and located generally in alignment with the installed shield.

6. The apparatus of claim 5 wherein the opposite end turns are similarly formed to permit reversible installation of the coil.

7. The apparatus of claim 4, wherein said shield includes an extension in the form of a flexible coil wound about the lead with a plurality of abutting turns, said coil being wound with the turns under tension at zero extension.

8. The apparatus of claim 7 wherein said igniting means is a spark plug and said shield includes a tubular metal cover placed over the spark plug and adjacent lead, and a shield extension in the form of a flexible coil wound about the lead with a plurality of abutting turns, said coil being wound with the turns under tension at zero extension.

9. The apparatus of claim 1 wherein said igniting means includes a spark plug, an insulating boot protecting the connection of the spark plug and the lead, said shield being a tubular member uninterrupted shield extended over the boot and spark plug and extending beyond the boot to overlie the adjacent lead wire, and a coil spring member encircling the end of the spark plug immediately adjacent the engine and adapted to be compressed between the shield member and the engine upon mounting of the spark plug to force a firm electrical contact between the shield and the spark plug to ground the shield to the spark plug.

10. The apparatus of claim 9 wherein said spark plug has a grounded flange portion in spaced relation to the engine, the end of the tubular shield member adjacent said flange portion including an inwardly projecting lip adapted to fit into abutting relation with the flange portion of the spark plug, and said coil spring being wound about the spark plug and compressed against the engine to force said lip into contact with said grounded flange portion.

11. The shield apparatus of claim 1 including a shield extension in the form of a flexible coil having an inner flared end trapped within an outer section of said shield.

12. The shield apparatus of claim 1 including a shield extension in the form of a flexible coil partly trapped within the outermost end of the shield.

13. The shield apparatus of claim 12 wherein said coil includes abutting turns and the coil turns being in tension at zero coil extension.

14. A spark plug shield apparatus having a chamber for a spark plug adapted to be secured with an engine block and projecting therefrom, said spark plug having a conductive ledge spaced from the engine block, and an L-shaped boot enclosing the major upper portion of the plug and essentially all of the boot, comprising a pair of shield members having overlapping edges and defining a tubular L-shaped jacket adapted to extend over the boot and spark plug, said shield extending beyond the boot to overlie the adjacent lead wire, means interconnecting the shield members to form a continuous uninterrupted shield, and the ends of the two shield members enclosing the spark plug including inwardly projecting lips adapted to approach one another and located beneath said ledge, a compression spring coil member separate from said two-piece shield members and located and adapted to abut the lips of the shield members, said spring coil being compressed between the lips and the engine to establish a firm electrical contact between the lips and said metal base portion of the spark plug in abutting relation with the metal base portion of the spark plug.

15. The shield apparatus of claim 14 wherein said shield members having hinge means to one side of the shield members enclosing the upper portion of the plug.

16. The shield member apparatus of claim 14 wherein each of said shield is similarly constructed with a hinge means connecting adjacent outer abutting edges of the shield members enclosing the upper portion of the plug, the opposite inner edges of the shield members overlapping in the closed position of the shield members.

17. The shield apparatus of claim 16 including a clip member releasably contracted over the outermost end of shield members enclosing the boot.

18. The shield apparatus of claim 14 wherein the outermost end of the shield members includes an outer section extending from the boot, said section including an integral flared connecting portion and an outer reduced diameter portion.

* * * * *

UNITED STATES PATENT OFFICE
CERTIFICATE OF CORRECTION

PATENT NO. : 3,965,879
DATED : June 29, 1976
INVENTOR(S) : ARTHUR O. FITZNER

It is certified that error appears in the above-identified patent and that said Letters Patent are hereby corrected as shown below:

Column 10, Line 33, CLAIM 16 after "shield" cancel "member";

Column 10, Line 34, CLAIM 16 after "shield" insert --- member ---;

Signed and Sealed this

Second Day of November 1976

[SEAL]

*Attest:*

RUTH C. MASON
*Attesting Officer*

C. MARSHALL DANN
*Commissioner of Patents and Trademarks*